United States Patent
Zukerman et al.

(10) Patent No.: US 10,446,189 B2
(45) Date of Patent: Oct. 15, 2019

(54) VIDEO MANIPULATION WITH FACE REPLACEMENT

(71) Applicant: Google Inc., Mountain View, CA (US)

(72) Inventors: Jokubas Zukerman, San Francisco, CA (US); Marco Paglia, San Francisco, CA (US); Chad Sager, Mountain View, CA (US); Andrew Poes, Mountain View, CA (US); Maegan Clawges, Mountain View, CA (US); Ivan Evfimiou, Mountain View, CA (US); Gregory Foster, Mountain View, CA (US); Samuel Keene, Mountain View, CA (US); John Gregg, Seattle, WA (US); Reed Morse, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/394,437

(22) Filed: Dec. 29, 2016

(65) Prior Publication Data
US 2018/0190322 A1 Jul. 5, 2018

(51) Int. Cl.
*G11B 27/00* (2006.01)
*H04N 5/93* (2006.01)
(Continued)

(52) U.S. Cl.
CPC ........ *G11B 27/036* (2013.01); *G06K 9/00228* (2013.01); *G06K 9/00765* (2013.01);
(Continued)

(58) Field of Classification Search
CPC . G11B 27/00; H04N 5/93; H04N 9/80; H04N 5/94
(Continued)

(56) References Cited

U.S. PATENT DOCUMENTS 7,184,100 B1    2/2007   Wilf et al.
7,826,644 B2 *  11/2010  Sharma .............. G06K 9/00221
                                                    382/118
(Continued)

OTHER PUBLICATIONS

Constine, J., "Now it's Periscope cloning Snapchat with augmented selfie masks." Techcrunch.com, Nov. 4, 2016, 9 Pages, Can be retrieved at <URL: https://techcrunch.com/2016/11/04/periscope-masks/>.
(Continued)

*Primary Examiner* — Daquan Zhao
(74) *Attorney, Agent, or Firm* — Lowenstein Sandler LLP

(57) ABSTRACT

A user device provides a user interface for video manipulation with face replacement. The user device accesses a source video including a group of frames and one or more faces. The user device also provides a set of stickers with alternate face graphics. Upon receiving selection of one of the stickers, one of the faces and one of the frames that includes the face from a user, the user device accesses a face frame sequence. The face frame sequence is a sequence of frames including the selected frame. And each frame of the face frame sequence includes the selected face. The user device sends to a server a request to replace the selected face with the selected sticker in the frame sequence and receives a manipulated video in response to the request, where the selected face is replaced with the selected sticker in each frame of the frame sequence.

22 Claims, 7 Drawing Sheets

(51) Int. Cl.
 *G11B 27/036* (2006.01)
 *H04N 21/81* (2011.01)
 *G06K 9/00* (2006.01)
 *G06T 11/40* (2006.01)
 *G06T 11/60* (2006.01)
 *H04N 9/80* (2006.01)
 *H04N 5/94* (2006.01)

(52) U.S. Cl.
 CPC .......... *G06K 9/00979* (2013.01); *G06T 11/40* (2013.01); *G06T 11/60* (2013.01); *H04N 21/8146* (2013.01)

(58) Field of Classification Search
 USPC ........ 386/287, 278, 285, 282, 280, 239, 248
 See application file for complete search history.

(56) References Cited

U.S. PATENT DOCUMENTS

| | | | |
|---|---|---|---|
| 2009/0143881 A1 | 6/2009 | Smyers | |
| 2009/0174787 A1* | 7/2009 | Grim, III | G06K 9/00295 348/222.1 |
| 2009/0252435 A1 | 10/2009 | Wen et al. | |
| 2010/0104146 A1* | 4/2010 | Momosaki | G06F 17/30781 382/118 |
| 2010/0245382 A1 | 9/2010 | Sio | |
| 2014/0112534 A1* | 4/2014 | Sako | G06F 21/6245 382/103 |
| 2016/0005435 A1* | 1/2016 | Campbell | H04N 9/806 386/240 |

OTHER PUBLICATIONS

PCT Notification of Transmittal of the International Search Report and the Written Opinion of the International Searching Authority for PCT Application No. PCT/US2017/054166, dated Dec. 11, 2017, 16 pages.

PCT Written Opinion of the International Preliminary Examining Authority for International Application No. PCT/US2017/054166, dated Dec. 13, 2018, 6 pages.

PCT, Written Opinion of the International Preliminary Examining Authority for PCT/US2017/054166, dated Mar. 12, 2018, 3 pages.

* cited by examiner

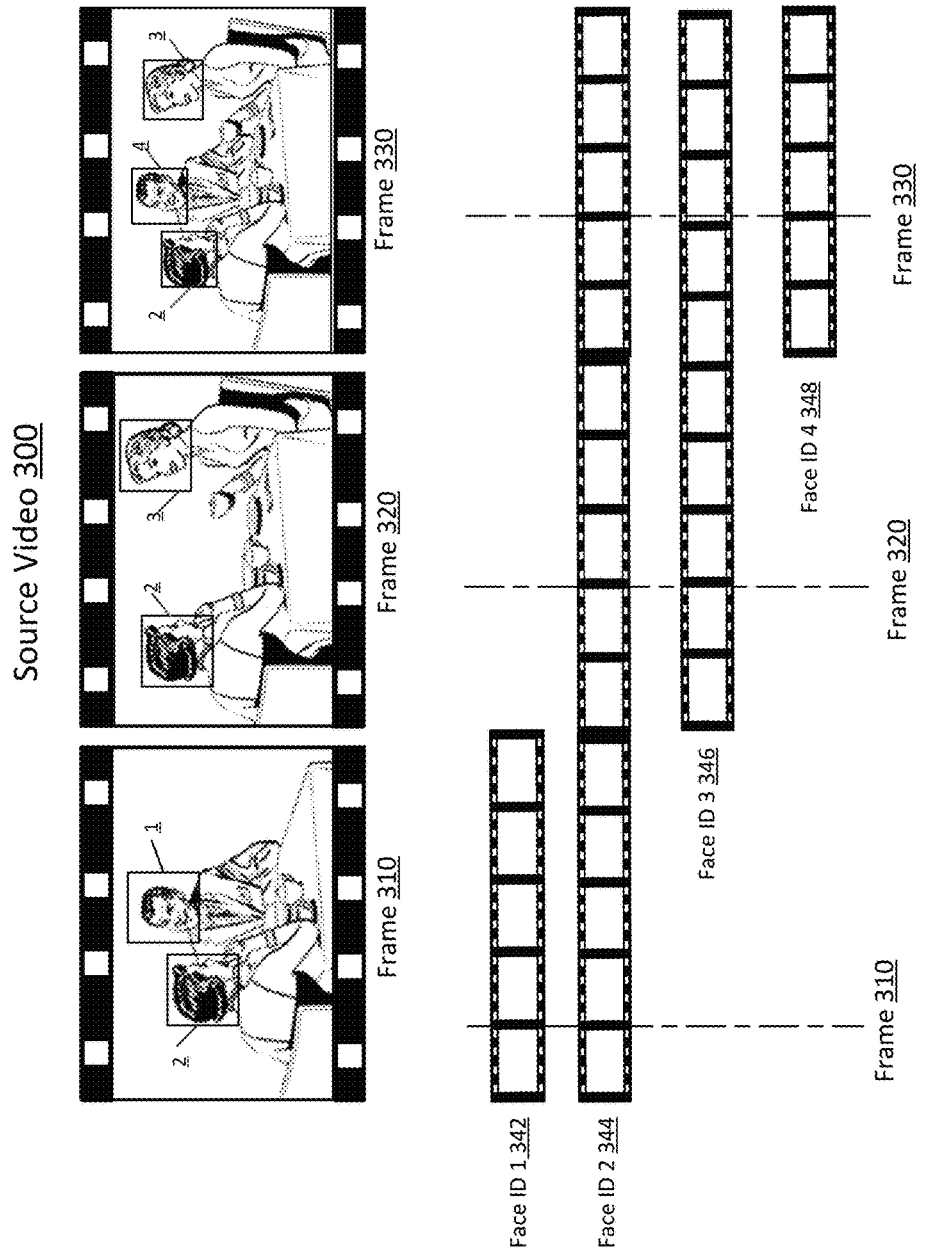

VIDEO MANIPULATION WITH FACE REPLACEMENT

BACKGROUND

1. Field of Art

This description generally relates to video processing, and more specifically to video manipulation with face replacement.

2. Description of the Related Art

Online systems store, index, and make available for consumption various forms of media content to Internet users. This content may take a variety of forms; in particular, video content, including streaming video is widely available across the Internet. Online video systems allow users to view videos uploaded by other users. These online video systems may contain thousands or millions of video files. Users of these online video systems may have interest in editing videos to make personal jokes between friends and for social commentary based news and worlds events. However, editing digitized or online video content generally requires sophisticated video editing software programs such as APPLE FINAL CUT PRO, ADOBE PREMIERE ELEMENTS, FILMORA, CYBERLINK POWERDIRECTOR 14 DELUXE, or other similar software programs. Generally these types of software require a significant amount of experience and practice to use effectively, and yet still do not provide automated, easy to use mechanisms for carrying out some desirable operations that a user may want to be easily and quickly repeatable.

SUMMARY

Described are methods, systems, and computer program instructions that allow for video manipulation via a reduced complexity user interface to replace the faces detected across frames in videos with "stickers" that are alternate face graphics or animations. By allowing for quick and easy swapping of faces with stickers in videos, users without significant experience with face editing software can quickly create "remixes" of videos of their choice to include stickers representing their friends, family, celebrities, or other people, animals, characters, animations, and so on.

In one example embodiment, a method includes accessing a source video comprising a plurality of frames that include one or more faces. A plurality of stickers are also provided where the stickers comprise alternate face graphics. A selection is received of one of the stickers, one of the faces, and one of the frames including the face. One of a number of face frame sequences is accessed where a face frame sequence is a sequence of frames including the selected frame and where each frame of the face frame sequence includes the selected face. The face frame sequence may be a continuous sequence of frames or a combination of one or more continuous sequences of frames. An instruction is sent to a remote computing device such as a server to replace the selected face with the selected sticker in each frame of the face frame sequence. In other embodiments, a similarly configured system or non-transitory computer readable storage medium provides for video manipulation where either the system includes or the medium works in conjunction with a computer processor to cause the computer processor to perform the steps mentioned above as set forth in the instructions.

Although the above example and following description describe a mechanism for easily performing video manipulation to replace faces within videos with stickers, the described methods, systems, and computer program instructions are not limited to replacement of faces specifically. In practice, any kind of detectable element can be replaced with other graphics or animations. Also, the described methods, systems, and computer program instructions can be used for replacement of objects in non-video media, e.g., still images, etc.

BRIEF DESCRIPTION OF THE FIGURES

FIG. 3A illustrates an example of identifying face frame sequences for various faces in a source video, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Environment Architecture

Figure 1:
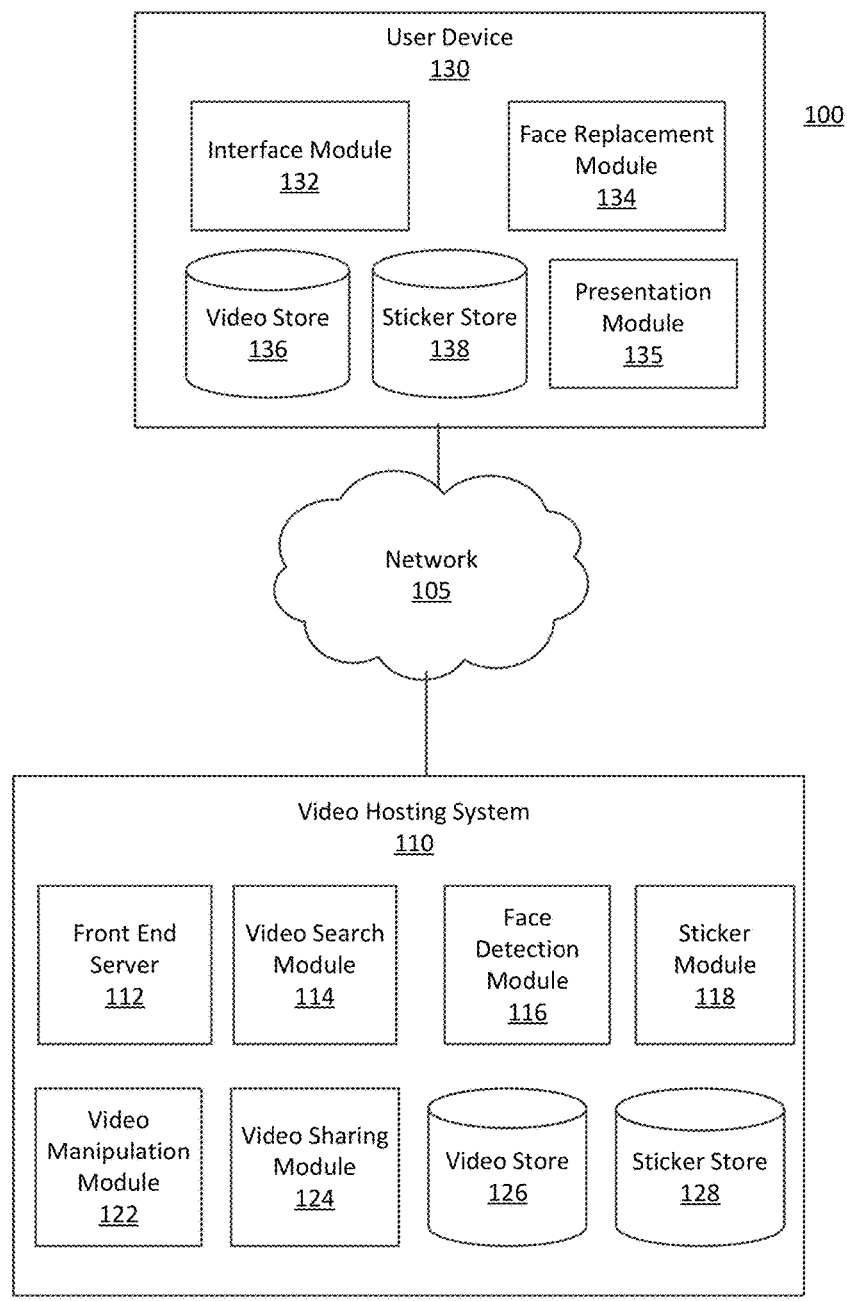
FIG. 1 is a high-level block diagram of a computer system environment for making available a user interface tool for video manipulation with face replacement, according to one embodiment.

FIG. 1 is a high-level block diagram of a computer system environment 100 for making available a user interface tool for video manipulation with face replacement, according to one embodiment. The computer system environment 100 allows users to easily manipulate videos to make personal jokes or social commentary by placing stickers on the faces of characters in a video. Stickers include alternate face graphics, e.g., head profiles of popular culture figures, friends or even users themselves. Users may also incorporate alternate audio tracks into the manipulated videos. The computer system environment 100 can also allow users to share their creations with other parties.

FIG. 1 illustrates a video hosting system 110 and a user device 130 connected by a network 105. Although FIG. 1 illustrates only a single user device 130, it should be understood that many user devices (e.g., millions) can communicate with the video hosting system 110 at any time. Only one user device 130 is illustrated in order to simplify and clarify the present description. Likewise, different and/or additional components may be included in the system environment 100. For example, the video hosting system 110 is a video sharing network, or another system providing videos to users.

The network 105 represents the communication pathways between the user device 130 and the video hosting system 110. In one embodiment, the network 105 is the Internet, but may also be any network, including but not limited to wired or wireless networks, cloud computing networks, private networks, virtual private networks, and any combination thereof. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Architecture of User Device Logical Components

The user device 130 communicates with the video hosting system 110 over the network 105. A user can use the user device 130 to access videos stored within the video hosting system 110. A user can access a video from the video hosting system 110 by browsing a catalog of videos, conducting searches using keywords, reviewing play lists from other users or the system administrator (e.g., collections of videos forming channels), or viewing videos associated with particular user groups (e.g., communities). Additionally, in some embodiments, the video hosting system 110 is adapted to receive videos for storage in order to allow for the sharing of the videos with other users. In one embodiment, the user device 130 is a computer system, such as a desktop or a laptop computer. Alternatively, the user device 130 may be a device having computer functionality, such as a personal digital assistant (PDA), a mobile device (e.g., telephone, tablet, a smartphone), or another suitable device. The user device 130 may also be another network-capable device such as a car entertainment system, television "set-top box," etc. In some embodiments, the user device 130 executes a web browser that allows a user to view web pages and videos provided by the video hosting system 110. In some other embodiment, the user device 130 executes a software application ("app") providing specific functionality for accessing the video hosting system 110.

In the embodiment of FIG. 1, the user device 130 provides functionality for the user to make requests for and manipulate videos. Generally this functionality is provided either through a web browser as introduced above or through a dedicated software application. For clarify of description, regardless of the whether the functionality is made available through a web browser or dedicated software application, FIG. 1 shows the various computer logic components that provide this functionality, including an interface module 132, a face replacement module 134, a presentation module, a video store 136, and a sticker store 138. Alternatively, the user device 130 may include additional, fewer, or different components for various applications. In some embodiments, the functions are distributed among the modules in a different manner than described herein. Moreover, the functions are performed by other entities in some embodiments.

The interface module 132 facilitates interaction of the user device 130 with the video hosting system 110 via the network 105. Examples of interactions handled by module 132 includes sending requests for face replacement made by the user to the video hosting system 110, where the user requests include identifying videos that the user wants to manipulate (also referred to as source videos), as well as identifying sets of stickers that the user would like to use to replace faces in the source videos.

The interactions handled by the interface module 132 also include receiving source videos, stickers, and manipulated videos from the video hosting system 110 as responses to the requests made by the user. The source videos and manipulated videos received from the video hosting system 110 can be stored in the video store 136 along with videos created by the user device 130, if any. Likewise, stickers received from the video hosting system 110 and created by the user device 130, if any, can be stored in the sticker store 138. The interface module 132 provides the received source videos, stickers, and manipulated videos to other entities (modules) of the user device 130. For example, the interface module 132 provides a source video and stickers to the face replacement module 132 which provides the functionality and associated user interface to allow the user to manipulate the source video, and provides the manipulated videos to the presentation module 135 so that the manipulated video can be presented to the user or other parties via a display screen (not shown) of the user device 130.

The face replacement module 134 provides an user interface to the user on the user device so that the user can manipulate a source video to replace one or more of the faces appearing in the source video. For example, the face replacement module 134 presents source videos received from the video hosting system 110 to the user and provides options to select one or more of the source videos. Once receiving selection of a source video by the user, the face replacement module 134 access the source video, e.g., by using a URL associated with the video, downloading the video to the user device 130, or retrieving the source video from the video store 136.

A source video comprises a plurality of frames that include one or more human or animal faces. In some embodiments, each face is highlighted and identified with a face identifier (ID) in each frame including the respective face. For example, the face is highlighted with a rectangle around the face and associated with an ID number. Alternatively, a face ID can be a letter, a symbol, or any combination thereof. In one embodiment, highlighting and identifying of each face in the source video is provided by the video hosting system 110 based on face detection. More details about the face detection by the video hosting system 110 is discussed below.

The face replacement module 134 receives each identified face along with an already-identified a face frame sequence or catalogs each identified face with a face frame sequence. A face frame sequence is a sequence of frames, where each frame in the face frame sequence includes the identified face. The face frame sequence, in one embodiment, is a continuous sequence of frames of the video, i.e., the face frame sequence is not interrupted with any frame that does not include the identified face. Alternatively, the face frame sequence may be a combination of one or more continuous sequence of frames, where the continuous sequences of frames are separated with one or more frames that do not include the face. Allowing for non-continuity in the face frame sequence between frames in a video is useful because in some instances it may be the case that the face is actually present in those frames of the video, however for one reason or another (e.g., noise, corruption in the source video) the face detection algorithm does not identify that the corresponding face is present for a small number of the frames even though often the face is actually present. Allowing face frame sequences to handle these small gaps makes the remaining process for face replacement more straight forward from a user interface and user-use perspective, because the resulting face frame sequences will likely better match the actual appearance of an identified face in the video than would breaking up face frame sequences every time the face detection algorithm failed to appropriately tag a face in every single frame. From the user's perspective, because of this the user interface presenting the face frame sequences for face replacement (described further below), will show fewer, longer face frame sequences, rather than more, shorter face frame sequences broken for no discernable reason. As the act of performing face replacement with stickers uses user input to select stickers and select face frame sequences that will include the stickers, having fewer face frame sequences is advantageous because it makes it easier for the user go through the video and perform face replacement on all instances of a given face.

Figure 3B:
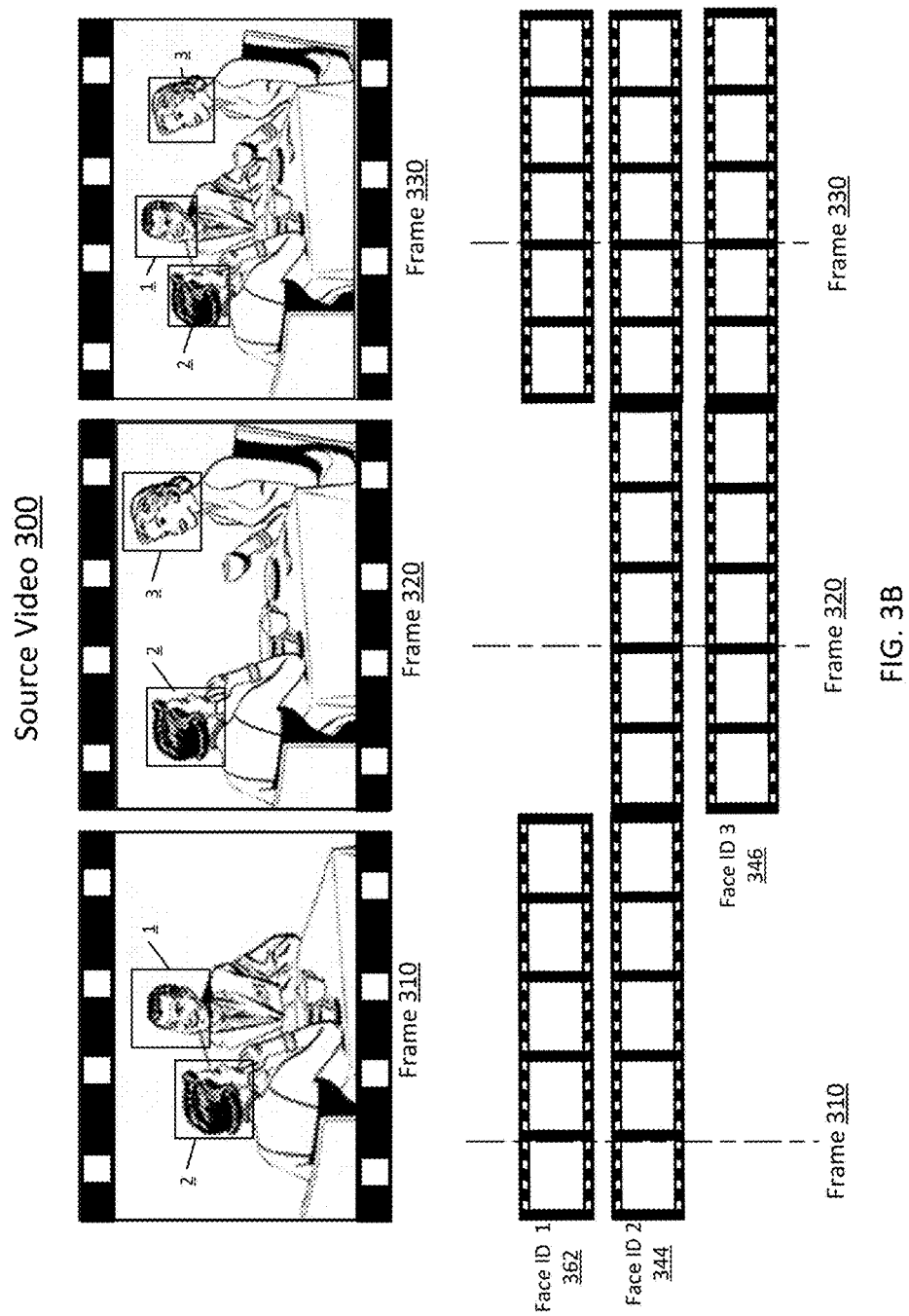
FIG. 3B illustrates an example of identifying face frame sequences for the various faces in the source video with user correction of face ID errors, according to one embodiment.

Turning now to FIG. 3A-B, FIG. 3A illustrates an example of identifying face frame sequences for various faces in a source video 300, according to one embodiment. In one embodiment, generation of the continuous sequences of frames is performed by a face detection module, e.g., the face detection module 116 of the video hosting system 110, based on a user request to identify face frame sequences for the faces in the source video 300. The face detection module detects and tracks each face included in the source video 300. The face detection module highlights each face in each frame where the respective face is detected. In the embodiment of FIG. 3A, each of the faces is highlighted with a rectangular around the face and associated with one or more face IDs. In other embodiments, a face can be highlight in other ways.

FIG. 3A shows three frames 310, 320, and 330 in the source video 300. In the source video 300, the frames between the frame 310 and frame 320 include the same faces as frame 310; the frames between the frame 320 and frame 330 include the same faces as the frame 320; and the frames after the frame 330 include the same faces as the frame 330. In the example of FIG. 3A, assume there are a number of frames between the frame 310 and frame 320, and also between the frame 320 and frame 330, and also after the frame 330. The face detection module generates two face IDs (Face ID 1 and Face ID 2) in the frame 310, two face IDs (Face ID 2 and Face ID 3) in the frame 320 and three face IDs (Face ID 2, Face ID 3, and Face ID 4) in the frame 330. Assuming for sake of example that the face detection module does not appropriately detect that Face 1 has reappeared later in the video, the face detection module generates a new face ID, Face ID 4, for a previously detected face (Face 1) in the frame 330 and the frames afterwards. In an example user interface, only one of frames 310, 320, and 330 may be provided for display at any given time, with associated user interface elements allowing the user to progress forward or backward through video, stop on a frame, or otherwise control playback of the source video. In FIG. 3A, multiple frames are provided for clarity and compactness of description.

FIG. 3A also illustrates four face frame sequences 342-348 corresponding to the four face IDs mentioned in the prior paragraph. As above the face detection module has not appropriately identified the faces and as such the face detection module identifies two different face frame sequences 342 and 348 for the same "actual" face in the source video (Face 1): the face frame sequence 342 for Face ID 1 and the face frame sequence 348 for Face ID 4. The face detection module identifies the face frame sequence 344 for Face ID 2 and the face frame sequence 346 for Face ID 3. Different from the faces associated with Face ID 1 and Face ID 4, each of the other two faces is associated with only one face ID.

In an example user interface, each face frame sequence is represented using a line-type graphical element, where demarcations may be present in the element between different frames or groups of frames within a face frame sequence. In the example of FIG. 3A, the example user interface illustrates using analog film frames to represent individual frames (or groups of frames). Vertical line graphical elements illustrate the locations of individual frames within the video. Per the above example where only a single frame is shown in the user interface, in that embodiment similarly a single vertical line may be shown corresponding to relative position along the face frame sequences where that frame appears.

FIG. 3B illustrates an example of identifying face frame sequences for the various faces in the source video 300 once user correction of face ID errors has been received, according to one embodiment. The example of FIG. 3B is a corrected version of the example of FIG. 3A. The face replacement module 134 provides, as part of a user interface, functionality to allow the user to correct face ID errors by selecting face frame sequences (e.g., by selecting the line graphical elements per the example above) and dragging and dropping the face frame sequences on top of each other. This will in turn cause merging of face frame sequences within an underlying data structure storing information about the frame contents of each face frame sequence, and/or the corresponding face ID associated with each face frame sequence. Additionally, the user interface may provide functionality allowing the user to split face frame sequences, so that some or all frames associated with a given face frame sequence/face ID pair may instead be assigned to a new Face ID or associated with a different existing face ID For example, the user, recognizing that Face ID 1 and Face ID 4 are actually associated with the same face, may correct the face ID error by combining the face frame sequences 342 and 348 into one face frame sequence 362. In this example, as there are no face frame sequences associated with what the face detection module resolved to be Face ID 4, the face detection module may remove Face ID 4 from the internal data structure storing the Face IDs and associated face frame sequences. Further, the face replacement module 134 re-labels any frames or other markups, such as labels associated with frame 330, with Face ID 1 instead. In this example, there is no error with face IDs for Face 2 and Face 3, and this example assumes, correspondingly, that the user has made no changes to face frame sequence 344 and 346.

Turning back to FIG. 1, the face replacement module 134 also provides a user interface presenting sets of stickers. The stickers can be received from the video hosting system 110. In one embodiment, the stickers are stored in the sticker store 138. Stickers are face graphics. The module 134 can receive one or more selections from a user regarding which stickers to replace with which faces in the frames of the source video. Examples of the stickers include head profiles of popular culture figures, top content (e.g., video) creators, and images generated by user, such as the user's face and individuals related to the user. The stickers may also include symbols, logos, buildings, animal or other types of non-human subjects. In one embodiment, the face replacement module 134 presents stickers in the form of "pack" sets. Each pack includes one or more stickers sharing the same theme or similar face graphics. For example, the stickers of one example pack are head profiles pictures of a popular culture figure and each sticker in the pack shows a unique facial expression of the figure, e.g., happy, excited, angry or sad. A sticker may also include an animation file, e.g., in the file format of GIF.

The face replacement module 134 receives, through the user interface, the user's selection of one of the stickers, one of the faces, and one of the frames including the selected face. For example, the user interface plays the video to the user and at the same time provides stickers to the user. Through functionality provided by the user interface, the user selects a sticker, a face and a frame by manipulating the user interface so that the selected sticker is placed on the selected face in the selected frame. In one embodiment, the placement is done by visually dragging the selected sticker into the selected frame during playback of the source video. When the user begins a drag action in the user interface, the source video may pause to give the user time to drop the selected sticker at a proper location at the selected frame, e.g., the location of the selected face. In another embodiment, the face replacement module 134 presents a menu of options upon selection of a face in a frame, where one of the options is to place a sticker on the face. When this option is selected, the face replacement module 134 presents a list of stickers. The user may select a sticker from the list. In other implementations the face replacement module 134 may provide alternative user interface mechanisms to allow the user to select stickers, faces, and frames.

Figure 4A:
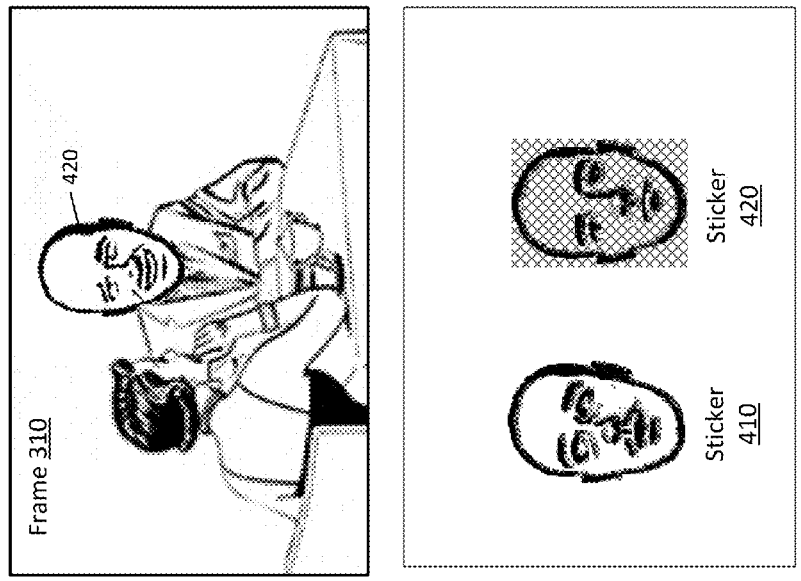
FIG. 4A illustrates an example of a client of a user device selecting a frame of the source video, a face in the frame, and a sticker to replace the selected face with the selected sticker, according to one embodiment.
Figure 4B:
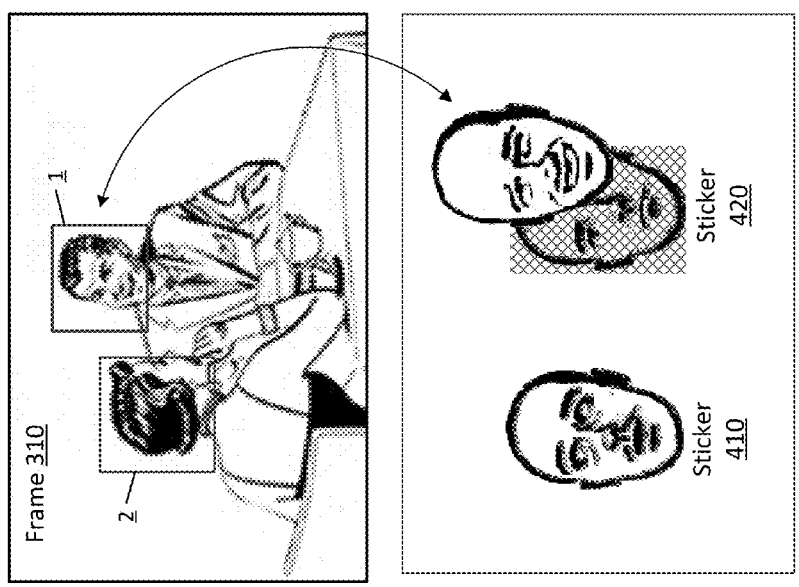
FIG. 4B illustrates an example of the selected face being replaced with the selected sticker in the selected frame of FIG. 4A, according to one embodiment.

Turning now to FIG. 4A-B, FIG. 4A illustrates an example of a user of a user device 130 selecting a frame 310 of the source video 300, a face (e.g., Face 1) in the frame 310, and a sticker 420 to replace the selected face with the selected sticker 420, according to one embodiment. FIG. 4B illustrates an example of the selected face being replaced with the selected sticker 420 in the selected frame 310 of FIG. 4A, according to one embodiment.

In the embodiment of FIG. 4A, during the playback of the source video 300, the user selects the frame 310 by dragging the sticker 420 into the frame 310. The user may pause the playback at the frame 310 to have to the time to drag the sticker 420 into the frame 310. The frame 310 includes two faces that are associated with Face ID 1 and Face ID 2, respectively. Each face can be highlighted by a rectangular around the face and labeled with its face ID number. A pack of stickers are presented to the user. The pack of stickers includes two stickers 410 and 420. As shown in 400, the user selects the sticker 420 by dragging the sticker 420 to frame 310. When the dragging begins, the source video 300 pauses to allow the user to place the sticker 420 on a face (e.g., Face 1) that the user selects. In other embodiments, the user may select a sticker in other ways. For example, upon clicking a sticker by the user, a menu of options is presented to the user. One of the options is to place the sticker onto a face. Alternatively, the user may tag a face and be presented an option to add a sticker onto the face. The user selects the face associated with Face ID 1 as the user drags the sticker 420 towards the face and places the sticker 420 onto the face (which is shown in FIG. 4B). As shown in FIG. 4B, the face associated with Face ID 1 is replaced by the sticker 420 and becomes invisible. Once the sticker 420 is placed on the face, the source video 300 may be played forward or backwards, paused or otherwise moved to any particular frame in the source 300.

Turning back to FIG. 1, upon receipt of a selection of a face/sticker/frame combination, the face replacement module 134 accesses a face frame sequence of the video for the selected face including the selected frame. The face replacement module 134 generates a request to replace the selected face with the selected sticker in the frames of the face frame sequence, i.e., a request for face replacement. The request for face replacement can be sent to the video hosting system 110 through the interface module 132. The video hosting system 110, upon receiving the request for face replacement, manipulates the source video based on the request for face replacement.

The face replacement module 134 may further provide a set of audio tracks of the source video to the user. The set of audio tracks may be stored in an audio store of the user device 130 or be provided by the video hosting system 110. Examples of audio tracks include tracks of music, dialogue, etc. In addition to face replacement, the user may have interest in adding or replacing the audio tracks of the face frame sequence to further alter the source video. The face replacement module 134 receives selection of a audio track from the user and generates a request to add, overlay or replace the selected audio track on the face frame sequence. In some embodiments, the face replacement module 134 may receive selection of a time frame from the user and generates a request to overlay the selected audio track on the source video during the selected time frame. A face frame sequence can be overlay with more than one audio track if requested. A request to overlay a selected audio track can be sent to the video hosting system 110 through the interface module 132.

A face in a given face frame sequence can be replaced with more than one sticker for different subsets of frames within the sequence. For example, assuming that a first sticker has already been used to replace a given face starting at an arbitrary "first" frame in a face frame sequence (which may be after the "starting" (or initial) frame in the first frame sequence), the face replacement module 134 may receive selection of a second sticker from the user for replacing the selected face for a portion of the face frame sequence. Accordingly, the face replacement module 134 generates a second request to replace the selected (first) sticker or the original face with the second sticker in all or a subset of the frames of the face frame sequence. The subset of the frames for replacement with the second sticker may start from the second frame (which may be the "starting" frame of the face frame sequence) and ends at the "first" frame as defined immediately above. Alternatively, the subset of the frames of the face frame sequence may start from the second frame and ends at the last frame of the face frame sequence. Any number stickers may be used in this manner, such that any configuration of stickers may be assigned to any requested subset of frames in a sequence. The selected face can be replaced multiple times, even at the same time/frame within their corresponding face frame sequences.

The presentation module 135 is configured to provide for display source videos and/or videos that have been manipulated to replace one or more of the videos with stickers and/or audio tracks (also referred to as "manipulated videos") received from the video hosting system 110 on the display of the user device 110. The presentation module may also provide an option to the user to share a manipulated video with other parties, for example, through the video hosting system 110 or another online system such as a social media online system.

Architecture of Video Hosting System Logical Components

The video hosting system 110 allows user devices 130 to access video content via searching and/or browsing interfaces made available, for example, through interface module 132. The sources of videos can be from user uploads of videos, searches or crawls of other websites or databases of videos, or the like, or any combination thereof. For example, in one embodiment a video hosting system 110 can be configured to allow for user uploads of content; in another embodiment a video hosting system 110 can be configured to only obtain videos from other sources by crawling such sources or searching such sources in real time. It will be understood that the term "website" represents any computer system adapted to serve content using any internetworking protocols, and is not intended to be limited to content uploaded or downloaded via the Internet or the HTTP protocol.

In general, functions not directly related to the user interface presented on the user device 130 that are described as being performed on the user device 130 may be performed on the video hosting system 110, and vice versa, particularly related to the operations performed by the face replacement module 134 and the modules 116, 118, 122, and 124. In addition, the functionality attributed to any particular component or module can be performed by different or multiple components operating together.

The video hosting system 110 manipulates source videos to perform face replacements based on user requests as introduced above. As shown in FIG. 1, the video hosting system 110 comprises a front end server 112, a video search module 114, a face detection module 116, a sticker module 118, a video manipulation module 122, a video sharing module 124, a video store 126, and a sticker store 128. In other embodiments, the video hosting system 110 may include additional, fewer, or different components for various applications. Many conventional features, such as firewalls, load balancers, application servers, failover servers, site management tools and so forth, are not shown so as not to obscure the features of the system.

The front end server 112 handles communications between the video hosting system 110 and the user device 130 via the network 105. The front end sever 112 receives user requests from the user device 130. User requests from the user device 130 include requests for source videos, requests for stickers, requests for face replacement, etc. The front end server 112, upon receiving user requests, interacts with one or more other entities (e.g., modules) of the video hosting system 110 to process the user requests. For example, the front end server 112 forwards user requests for source videos to the video search module 114, user requests for stickers to the sticker module 118, and user requests for face replacement to the video manipulation module 112. The front end server 112 also receives information from the other entities of the video hosting system 110 for responding to the user requests. For example, the front end server 112 receives manipulated videos from the video manipulation module 112 and sends the manipulated videos to the user device 130 as responses to user requests for face replacement.

The front end server 112 may be further configured to transmit and present the requested video and related video links to the user device 130 on a webpage. The requested video is streamed by the front end server 112 to the user device 130. One or more related video links appear on the webpage where the requested video is playing, such that the related video link can be selected by a user in order to view the related videos.

The video search module 114 processes user requests for source videos and provides source videos matching the user requests to the front end server 112. In one embodiment, a user request includes a search query specifying one or more search terms. The video search module 114 may use the search terms, for example, to query the metadata of all video files stored in the video store 126. The search results are the source videos of which the associated metadata is relevant to the search terms. The search results from the query are transmitted to the front end server 112, so that the search results can be presented to the user at the user device 130. In another embodiment, a user request specifies a source video. The source video may be specified by a category of the video hosting system 110 or by a web link to the source video. The user request transmitted by the user device 130 can include an identifier of the specific source video. The identifier of the specific source video can be included automatically into the user request once the user clicks on the link for the specific source video at the user device 130. The video search module 114 uses the identifier to search and identify the specific source video in the video store 126. The video search module 114 provides the source video to the front end server 112; and the latter sends the source video to the user device 130 for presentation to the user.

The face detection module 116 identifies distinct faces in individual frames of a source video and identifies the two dimensional location (and in some instances size) of each face in the frame. Note that the faces identified by module 116 are not personally identified as particular real world persons, or connected with any larger corpus of information outside the video for the purpose of performing such a task. Instead, module 116 identifies faces merely to tag the presence of distinct faces relative to each other face in a given frame, and also across the frames of the video. Per the remainder of this description, these identified faces are used for the purpose of permitting, via the user interface, the ability for the user to select stickers with which to replace one or more of the distinctly identified faces present in the video.

The face detection module 116 further links the appearance each distinct face throughout the source video to identify the appearance of a given face across multiple sets of sequential frames throughout a video, each of such sets herein being referred to as a face frame sequence for that face. In one embodiment, the face detection module 116 uses a motion tracking algorithm to track identified faces throughout the video. The motion tracking allows less or minimal manual operation to ensure continuity but tracks faces more accurately when orientations of the face changes in the video. Upon identification of a face in the source video, the face detection module 116 assigns one or more ID numbers to the face. The face is associated with a ID number in a face frame sequence of the face. Face IDs are used to exchange requests with the user device 110 to effect manipulations on a video, such as face replacements for particular faces and face frame sequences with particular sequences, and may also be used in audio track replacement.

Face detection may be performed when a video is uploaded to the video hosting system 110 or asynchronously whenever is convenient for the video hosting system 110 as face detection is a computationally intensive, one-time operation that generally does not need to be repeated once completed. The video hosting system 110 may also make available a user interface allowing users to perform manual touch-ups on face identifications and face frame sequences to ensure a quality result.

The face detection module 116 may further provide, through the interface module 132, a user interface tool so that the user device 130 is able to receive inputs from a user regarding modifications and selection of which identified faces from different face frame sequences are the same character in the video. Often this is relevant for when automated face detection has identified two distinct faces which in truth are one face, which the user interface allows the user to provide input to correct. Often this occurs across camera cuts and scene cuts.

Each source video is associated with face detection information that indicates one or more face frame sequences for each face in the source video, as labeled by face ID for example, and locations of the face in each frame of the face frame sequences. The face detection information of the source video is provided to the user device 130 for providing a user interface for face replacement.

The sticker module 118 receives and provides stickers to the front end server 112 for exchange with the user device 130. The user device 130 request stickers for use in the user interface module 132, or it may receive stickers generated at the user device 130. Stickers are stored in the sticker store 128. As a request response example, a user request may include terms describing a theme. Based on the terms, the sticker module 118 retrieves stickers matching the theme from the sticker store 128 and provides the stickers to the front end server 112 for sending the stickers to the user device 130. As another example, a user request may specify one or more stickers.

The video manipulation module 122 manipulates source videos with face replacement in response to user requests for video manipulation. As discussed above, a user request for face replacement includes a request to replace a selected face in a source video with a selected sticker in all frames of a face frame sequence or a subset of the frames of the face frame sequence.

The video manipulation module 122 identifies the face frame sequence to be manipulated with a sticker or replacement/additional/overlay audio based on the user request identifying the content to be replaced. The video manipulation module 122 also identifies locations of the selected face in each frame of the face frame sequence based on the face detection information associated with the source video. Based on the location of the selected face, the video manipulation module 122 generates a manipulated face frame sequence. In each frame of the manipulated face frame sequence, the selected face is replaced with the selected sticker. This may be accomplished by simply overlaying the face with the selected sticker from the request, however more complex replacement (such as pixel-by-pixel replacement) or any other method may also be used. The selected sticker can be animated in the manipulated face frame sequence. In one embodiment, the selected sticker is itself an animation file, e.g., a GIF file containing not just a single image but multiple images. In another embodiment, the user interface presented to the user, for example via the interface module 132, includes user interface tools for generating animations to use as stickers. For example, the video manipulation module 122 replaces the selected face with the selected sticker of the original size in a first frame of the manipulated face frame sequence, but enlarges the selected sticker in a second frame of manipulated the face frame sequence.

When the video manipulation module 122 receives multiple user requests to replace a selected face with one or more other stickers or replace one or more other faces with stickers, the video manipulation module 122 is able to manipulates the source video accordingly in response to all of these requests. For example, when the video manipulation module 122 receives a user request to replace the selected face with a second sticker different from the selected sticker, the video manipulation module 122 generate a second manipulated face frame sequence. In each frame of the second manipulated face frame sequence, the selected face is replaced with the second sticker.

Depending upon how the face replacement was performed, the resulting manipulated video may include additional metadata that includes the stickers, and their frame assignments and locations. However, generic video playback systems may not be configured to handle this additional metadata. As such, the video manipulation module 122 is further able to generate a manipulated video that is in an expected video format without such metadata. This may be accomplished, for example, by re-rendering the video to incorporate sticker data directly into the pixels or other native video content dictated by whatever codec is used to render the video. In some embodiments, the manipulated video has a video file format compatible with video players. Examples of the video file format include MP4, GIF, WMV, and AVI. The video manipulation module 122 may send the manipulated video to the user device 130 via the front end server 112 and/or store the manipulated video in the video store 126.

The video hosting system 110 may also receive a request from the user device to share or otherwise transmit the manipulate video. To facilitate this among other reasons, the processing of the video file includes assigning an identifier to the newly received video file. Processing of the video file may include formatting (e.g., transcoding), compressing, metadata tagging, content analysis, and/or other data processing methods. In one embodiment, the user device 130 transmits descriptive metadata along with the video file transmitted to the video hosting system 110. The descriptive metadata may have been provided by the user and may include, for example, a new video title, description, and tag information).

The video sharing module 124 stores the processed video file in the video store 126 and stores the information included in the form as metadata of the video file. The video store 126 is the storage system where the video files transmitted to the video hosting system 110 are stored. A video may be accompanied by icons or thumbnail views, associated metadata, such as title, author, tags, description, comments, and rating. In various embodiments, the video sharing module 124 may pass received videos directly to the video similarity engine 110 for analysis.

Figure 2:
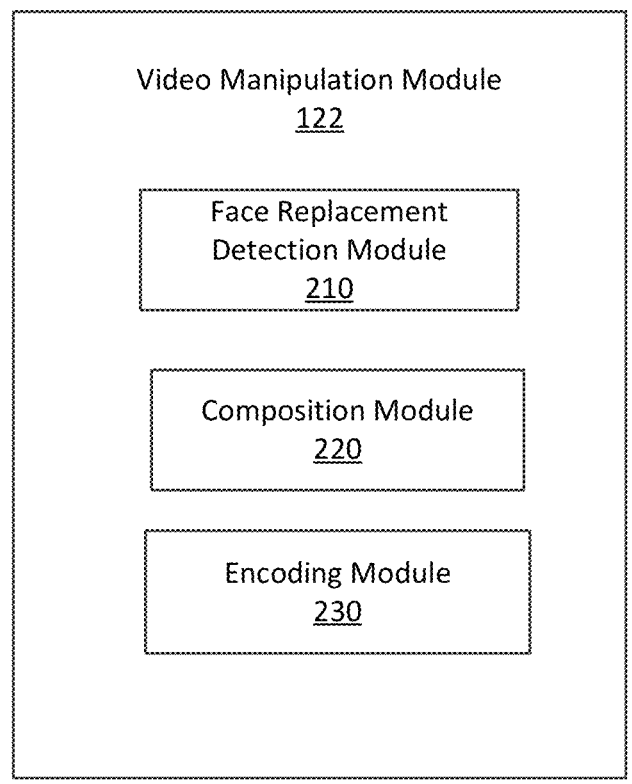
FIG. 2 is a block diagram illustrating a detailed view of a video manipulation module, according to one embodiment.

FIG. 2 is a block diagram illustrating a detailed view of a video manipulation module 122, according to one embodiment. The video manipulation module 122 includes a face replacement detection module 210, a composition module 220, and an encoding module 230. In some embodiments, the functions are distributed among the modules in a different manner than described herein. Moreover, the functions are performed by other entities in some embodiments.

When the video manipulation module 122 receives a user request for video manipulation from the front end server 112, the face replacement detection module 210 analyzes the user request to identify a selected sticker, a selected face and a face frame sequence in the user request. The face replacement detection module further locates the selected face in each frame of the face frame sequence based on face detection information associated with the source video of the user request. Based on the analysis of the user request and the face detection information, the face replacement detection module 210 determines the location to place the selected sticker in each frame of the face frame sequence. In one embodiment, the face replacement detection module 210 outputs a face replacement model. The face replacement model represents which sticker is applied to which face in which frame in which video. The face replacement detection module 210 further converts the face replacement model to a list of sticker locations at each frame of the face frame sequence. When there is a second user request for modifying or updating the user request, the face replacement module 210 modifies or updates the face replacement model accordingly.

The composition module 220 composes the source video and the selected sticker based on the list of sticker locations. The composition module 220 creates a video composition, where the selected sticker can be placed at each of the sticker locations on the list.

The encoding module 230 encodes the video composition to create a manipulated video including a manipulated face frame sequence based on an encoding protocol. The encoding protocol may be selected by the user and included in the user request. Alternatively, the encoding module 230 selects an encoding protocol to encode the video composition into a format suitable for a particular video player. For example, the encoding module 230 creates an MP4 video file from the video composition. If the user request includes another option, e.g., GIF option, the encoding module 230 converts the MP4 video file into a GIF file.

Example Manipulated Video

Figure 5:
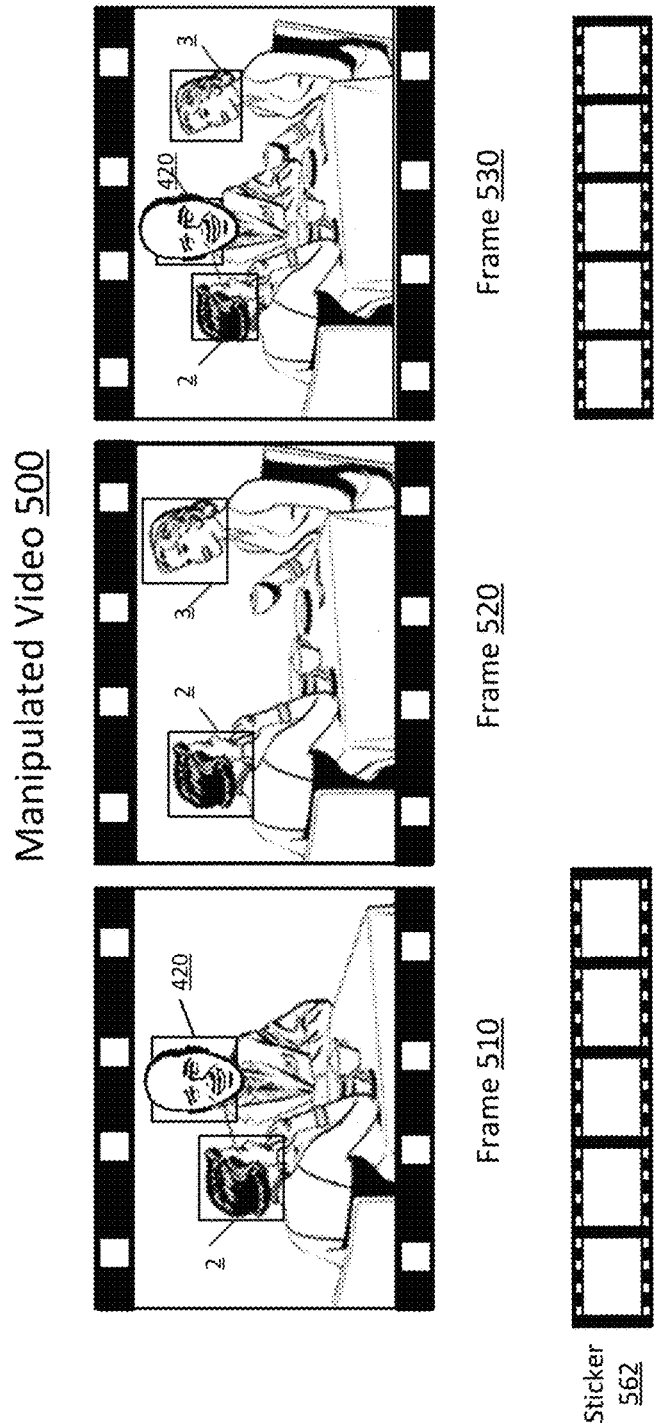
FIG. 5 illustrates an example of a manipulated video including a manipulated face frame sequence where the selected face is replaced with the selected sticker, according to one embodiment.

FIG. 5 illustrates an example of a manipulated video 500 including a manipulated face frame sequence 562 where the selected face 1 is replaced with the selected sticker 420, according to one embodiment. As shown in FIG. 5, a manipulated frame 510 is generated from the frame 310 when the selected sticker 420 replaces the selected face 1 in the frame 310. Even though the user did not select the frame 330, the frame 330 becomes a manipulated frame 530 because the frame 330 is included in the face frame sequence 362 for the face 1. Likewise, the other frames of the face frame sequence 362 are manipulated. As a result, the manipulated face frame sequence 562 is generated and the manipulated video 500 including the manipulated face frame sequence 562 is generated. As the location of the selected face 1 in the face frame sequence 362 changes, the location of the selected sticker 420 in the manipulated face frame sequence 562 changes. Consequently, as the manipulated video 500 plays, the selected sticker 420 is animated.

Process of Video Manipulation

Figure 6:
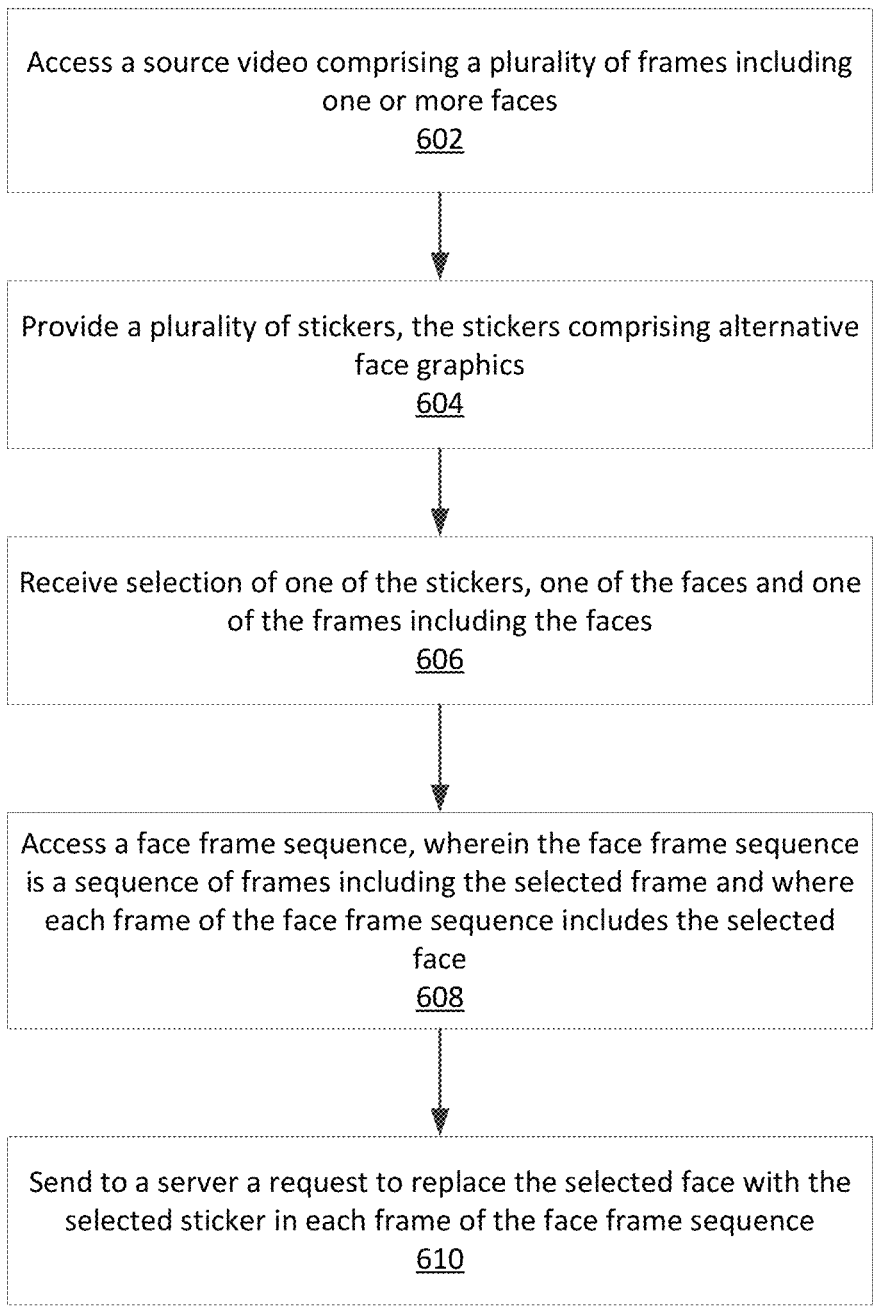
FIG. 6 illustrates a flow chart of an example process of allowing for video manipulation with face replacement, according to one embodiment.

FIG. 6 illustrates a flow chart of an example process of allowing for video manipulation with face replacement, according to one embodiment. In some embodiments, the method is performed by the face replacement module 134 of the user device 130, although some or all of the operations in the method may be performed by other entities in other embodiments. In some embodiments, the operations in the flow chart are performed in a different order and can include different and/or additional steps.

The face replacement module 134 accesses 602 a source video comprising a plurality of frames including one or more faces. For example, the face replacement module 134 sends a video search query to a video hosting system 110 for source videos matching the search terms in the query. Upon receiving search results from the video hosting system 110, the face replacement module 134 receives a selection of a source video from the search result and access the selected source video, e.g., by using a URL associated with the source video or downloading the source video to the user device 130. For another example, the face replacement module 134 sends a requests for a specific source video to the video hosting system 110 and access the source video from the video hosting system 110. The faces in the source video have been detected, e.g., by the video hosting system 110. Thus, when the face replacement module 134 presents the source video to a user of the user device 130, the faces in the source video are highlighted. The user may therefore select one of the faces at a frame of the source video. The face replacement module 134 also provides 604 a plurality of stickers. The user can select one of the stickers. In some embodiments, the stickers comprise face graphics. The stickers may be created by the user of the user device 130 or obtained from the video hosting system 110.

The face replacement module 134 receives 606 selection of one of the stickers, one of the faces and one of the frames or face frame sequences including the selected face. The selection is received from the user providing input to the user device 130. The face replacement module 134 accesses 608 a face frame sequence, wherein the face frame sequence is a sequence of frames including the selected frame and where each frame of the face frame sequence includes the selected face. The face frame sequence is generated by the video hosting system 110 based on face detection. The face replacement module 134 further sends 610 to a server a request to replace the selected face with the selected sticker in each frame of the face frame sequence. In one embodiment, the server is the front-end server 112 of the video hosting system 110.

Additional Considerations

Some portions of the above description present the feature of the present invention in terms of algorithms and symbolic representations of operations on information. These algorithmic descriptions and representations are the means used by those skilled in the arts to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A computer-implemented method for allowing for manipulation of a video, comprising:
   accessing the video comprising a plurality of frames that comprise one or more faces;
   accessing a plurality of face frame sequences, wherein each face frame sequence is a sequence of frames of the video comprising one face of the one or more faces, the one face comprised in each frame of the sequence of frames and identified in each frame of the sequence of frames by at least one face identifier;
   receiving, from a user device via a user interface, user selection of at least one of the plurality of face frame sequences in which the one face is identified by different face identifiers;
   merging the selected face frame sequences into a combined face frame sequence in a data structure that stores information about contents of the plurality of frames;
   assigning a single face identifier to the one face in the combined face frame sequence in the data structure;
   removing, from the data structure, one or more of the different face identifiers that are no longer assigned to the one face;
   providing a plurality of stickers, the stickers comprising alternate face graphics;
   receiving, from the user device via the user interface, user selection of: one of the stickers, one of the frames of the combined face frame sequence, and the one face identified by the single face identifier; and
   sending, to a server, a user request to replace the selected one face with the selected sticker in each frame of the combined face frame sequence.

2. The method of claim 1, wherein accessing the plurality of face frame sequences comprises receiving the plurality of face frame sequences from the server.

3. The method of claim 1, wherein each face frame sequence is a continuous sequence of frames.

4. The method of claim 1, wherein the selected frame is a first frame in the combined face frame sequence.

5. The method of claim 1, further comprising:
   receiving from the server a manipulated face frame sequence, wherein the selected face is replaced with the selected sticker in each frame of the manipulated face frame sequence relative to the combined face frame sequence; and
   presenting the manipulated frame sequence.

6. The method of claim 1, further comprising:
   receiving selection of a second sticker; and
   sending to the server a second request to replace the selected face with the second sticker in each frame of the combined face frame sequence.

7. The method of claim 1, further comprising:
   receiving selection of a second sticker, and a second frame, wherein the second frame is after the selected frame in the combined face frame sequence; and
   sending to the server a second request to replace the selected sticker with the second sticker in the second frame and each frame after the second frame in the combined face frame sequence.

8. The method of claim 1, further comprising:
   receiving selection of a second sticker and a second frame, wherein the second frame is before the selected frame in the combined face frame sequence; and
   sending to the server a second request to replace the selected sticker with the second sticker in the second frame and each frame between the second frame and the selected frame in the combined face frame sequence.

9. The method of claim 1, further comprising:
   providing a plurality of audio tracks;
   receiving selection of one of the audio tracks; and
   sending to the server a request to overlay the selected audio track on the combined face frame sequence.

10. A system of allowing for manipulation of a video, comprising:
    a computer processor; and
    a non-transitory computer-readable storage medium storing computer executable components configured to cause the computer processor to perform:
      accessing the video comprising a plurality of frames that comprise one or more faces;
      accessing a plurality of face frame sequences, wherein each face frame sequence is a sequence of frames of the video comprising one face of the one or more faces, the one face comprised in each frame of the sequence of frames and identified in each frame of the sequence of frames by at least one face identifier;
      receiving, from a user device via a user interface, user selection of at least one of the plurality of face frame sequences in which the one face is identified by different face identifiers;
      merging the selected face frame sequences into a combined face frame sequence in a data structure that stores information about the contents of the plurality of frames;
      assigning a single face identifier to the one face in the combined face frame sequence in the data structure;
      removing, from the data structure, one or more of the different face identifiers that are no longer assigned to the one face;
      providing a plurality of stickers, the stickers comprising alternate face graphics;
      receiving, from the user device via the user interface, user selection of: one of the stickers, one of the frames of the combined face frame sequence, and the one face identified by the single face identifier; and sending, to a server, a user request to replace the selected one face with the selected sticker in each frame of the combined face frame sequence.

11. The system of claim 10, wherein the computer executable components are further configured to cause the processor to perform:
receiving from the server, the plurality of face frame sequences.

12. The system of claim 10, wherein each face frame sequence is a continuous sequence of frames.

13. The system of claim 10, wherein the selected frame is a first frame in the combined face frame sequence.

14. The system of claim 10, wherein the computer executable components are further configured to cause the processor to perform:
receiving from the server a manipulated frame sequence, wherein the selected face is replaced with the selected sticker in each frame of the manipulated face frame sequence relative to the combined face frame sequence; and
presenting the manipulated frame sequence.

15. The system of claim 10, wherein the computer executable components are further configured to cause the processor to perform:
receiving selection of a second sticker, and a second frame, wherein the second frame is after the selected frame in the combined face frame sequence; and
sending a request to the server to replace the selected sticker with the second sticker in the second frame and each frame after the second frame in the combined face frame sequence.

16. The system of claim 10, wherein the computer executable components are further configured to cause the processor to perform:
receiving selection of a second sticker and a second frame, wherein the second frame is before the selected frame in the combined face frame sequence; and
sending a request to the server to replace the selected sticker with the second sticker in the second frame and each frame between the second frame and the selected frame in the combined face frame sequence.

17. The system of claim 10, wherein the computer executable components are further configured to cause the processor to perform:
providing a plurality of audio tracks;
receiving selection of one of the audio tracks; and
sending to the server a request to overlay the selected audio track on the combined face frame sequence.

18. A non-transitory computer readable storage medium storing executable computer program instructions for allowing for manipulation of a video, the computer program instructions comprising instructions that when executed cause a computer processor to:
access the video comprising a plurality of frames that comprise one or more faces;
access a plurality of face frame sequences, wherein each face frame sequence is a sequence of frames of the video comprising one face of the one or more faces, the one face comprised in each frame of the sequence of frames and identified in each frame of the sequence of frames by at least one face identifier;
receive, from a user device via a user interface, user selection of at least one of the plurality of face frame sequences in which the one face in the plurality of face frame sequences is identified by different face identifiers;
merge the selected face frame sequences into a combined face frame sequence in a data structure that stores information about the contents of the plurality of frames;
assign a single face identifier to the one face in the combined face frame sequence in the data structure;
remove, from the data structure, one or more of the different face identifiers that are no longer assigned to the one face;
provide a plurality of stickers, the stickers comprising alternate face graphics;
receive, from the user device via the user interface, user selection of: one of the stickers, one of the frames of the combined face frame sequence, and the one face identified by the single face identifier; and
send, to a server, a user request to replace the selected one face with the selected sticker in each frame of the combined face frame sequence.

19. The computer readable medium of claim of claim 18, wherein the instructions further cause the computer processor to:
receive, from the server, the plurality of face frame sequences.

20. The computer readable medium of claim of claim 18, wherein the instructions further cause the computer processor to:
receive from the server a manipulated frame sequence, wherein the selected face is replaced with the selected sticker in each frame of the manipulated face frame sequence relative to the combined face frame sequence; and
present the manipulated frame sequence.

21. The computer readable medium of claim of claim 18, wherein the instructions further cause the computer processor to:
receive selection of a second sticker, and a second frame, wherein the second frame is after the selected frame in the combined face frame sequence; and
send a request to the server to replace the selected sticker with the second sticker in the second frame and each frame after the second frame in the combined face frame sequence.

22. The computer readable medium of claim of claim 18, wherein the instructions further cause the computer processor to:
receive selection of a second sticker and a second frame, wherein the second frame is before the selected frame in the combined face frame sequence; and
send a request to the server to replace the selected sticker with the second sticker in the second frame and each frame between the second frame and the selected frame in the combined face frame sequence.

* * * * *